United States Patent
Ashokkumar et al.

(10) Patent No.: US 10,936,428 B2
(45) Date of Patent: Mar. 2, 2021

(54) SYSTEM AND METHOD TO IMPLEMENT AUTOMATED APPLICATION CONSISTENT VIRTUAL MACHINE IMAGE BACKUP

(71) Applicant: EMC IP Holding Company LLC, Hopkinton, MA (US)

(72) Inventors: Pravin Kumar Ashokkumar, Bangalore (IN); Ramesh Sunder Andra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 165 days.

(21) Appl. No.: 16/253,857

(22) Filed: Jan. 22, 2019

(65) Prior Publication Data
US 2020/0233750 A1 Jul. 23, 2020

(51) Int. Cl.
G06F 11/00 (2006.01)
G06F 11/14 (2006.01)
G06F 9/455 (2018.01)
G06F 9/54 (2006.01)

(52) U.S. Cl.
CPC ...... *G06F 11/1451* (2013.01); *G06F 9/45558* (2013.01); *G06F 9/54* (2013.01); *G06F 2009/45583* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 8,065,272 | B2* | 11/2011 | Stringham | G06F 11/1451 707/644 |
| 9,304,864 | B1* | 4/2016 | Bushman | G06F 11/1435 |
| 9,311,190 | B1* | 4/2016 | Bushman | G06F 3/067 |
| 9,830,471 | B1* | 11/2017 | Rokicki | G06F 21/6236 |
| 10,122,806 | B1* | 11/2018 | Florissi | G06F 16/00 |
| 2009/0300080 | A1* | 12/2009 | Stringham | G06F 11/1451 |
| 2015/0178109 | A1* | 6/2015 | Li | G06F 9/45558 718/1 |
| 2015/0324217 | A1* | 11/2015 | Shilmover | G06F 9/45558 718/1 |
| 2015/0378636 | A1* | 12/2015 | Yadav | G06F 3/0652 711/165 |
| 2016/0094624 | A1* | 3/2016 | Mordani | H04L 67/42 709/203 |
| 2016/0357640 | A1* | 12/2016 | Bushman | G06F 3/0619 |
| 2016/0357641 | A1* | 12/2016 | Bushman | G06F 11/1435 |
| 2016/0357769 | A1* | 12/2016 | Bushman | G06F 16/128 |
| 2018/0060184 | A1* | 3/2018 | Thakkar | G06F 9/461 |

* cited by examiner

*Primary Examiner* — Farhan M Syed
(74) *Attorney, Agent, or Firm* — Chamberlain, Hrdlicka, White, Williams & Aughtry (57) ABSTRACT

A method for performing backup operations includes selecting an application executing on a virtual machine (VM) to quiesce, generating, using a pre-snapshot template for the application, a pre-snapshot script for the application, generating a snapshot of the virtual machine after the pre-snapshot script has executed on the VM, and initiating a backup operation for the VM using the snapshot.

15 Claims, 5 Drawing Sheets

SYSTEM AND METHOD TO IMPLEMENT AUTOMATED APPLICATION CONSISTENT VIRTUAL MACHINE IMAGE BACKUP

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to a method for performing backup operations in accordance with one or more embodiments of the invention. The method includes selecting an application executing on a virtual machine (VM) to quiesce, generating, using a pre-snapshot template for the application, a pre-snapshot script for the application, generating a snapshot of the virtual machine after the pre-snapshot script has executed on the VM, and initiating a backup operation for the VM using the snapshot.

In one aspect, a system in accordance with one or more embodiments of the invention includes a processor and a backup agent when executed by the processor performs a method. The method includes selecting an application executing on a virtual machine (VM) to quiesce, generating, using a pre-snapshot template for the application, a pre-snapshot script for the application, generating a snapshot of the virtual machine after the pre-snapshot script has executed on the VM, and initiating a backup operation for the VM using the snapshot.

In one aspect, non-transitory computer readable medium in accordance with one or more embodiments of the invention includes computer readable program code, which when executed by a computer processor enables the computer processor to perform a method for performing backup operations. The method includes selecting an application executing on a virtual machine (VM) to quiesce, generating, using a pre-snapshot template for the application, a pre-snapshot script for the application, generating a snapshot of the virtual machine after the pre-snapshot script has executed on the VM, and initiating a backup operation for the VM using the snapshot.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for maintaining application consistency during a backup operation for a virtual machine. More specifically, embodiments of the invention relate to a method for identifying active applications in the virtual machine, generating a script to quiesce one or more active applications on the virtual machine, and generating a script to unquiesce the aforementioned quiesced applications after a snapshot is taken of the virtual machine. In one or more embodiments of the invention, a backup may be generated using the snapshot and sent to a backup storage device.

Figure 1:
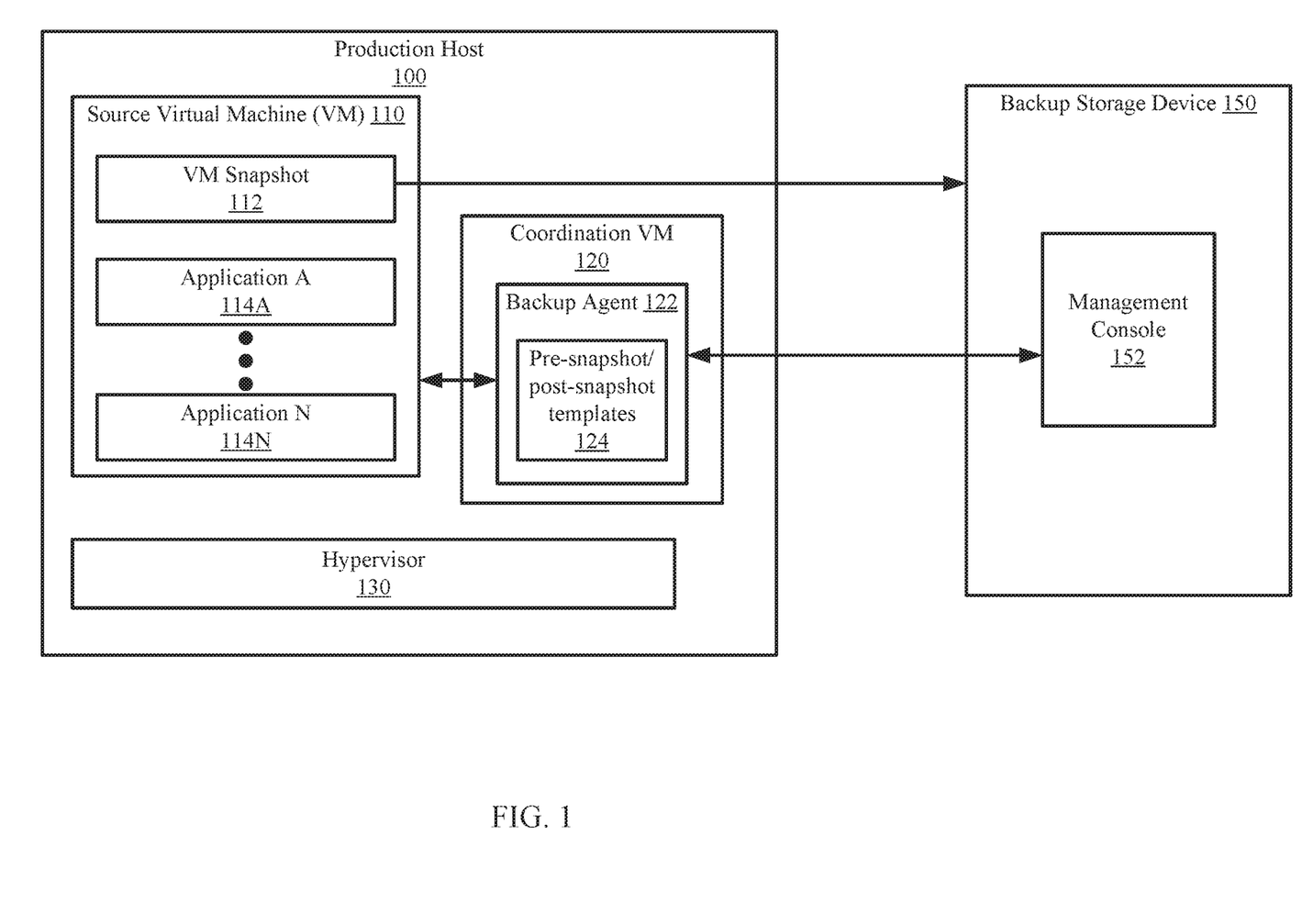
FIG. 1 shows a diagram of a system in accordance with one or more embodiments of the invention.

FIG. 1 shows an example system in accordance with one or more embodiments of the invention. The system includes a production host (100) and a backup storage device (150). Each component of the system may be operably connected via any combination of wired and/or wireless connections. Each component of the system in FIG. 1 is discussed below.

In one or more embodiments of the invention, the production host (100) hosts virtual machines (VMs). The production host may host any number of virtual machines (e.g., 110, 120) that each run applications (e.g., databases) that may be backed up in a backup storage device.

Figure 4:
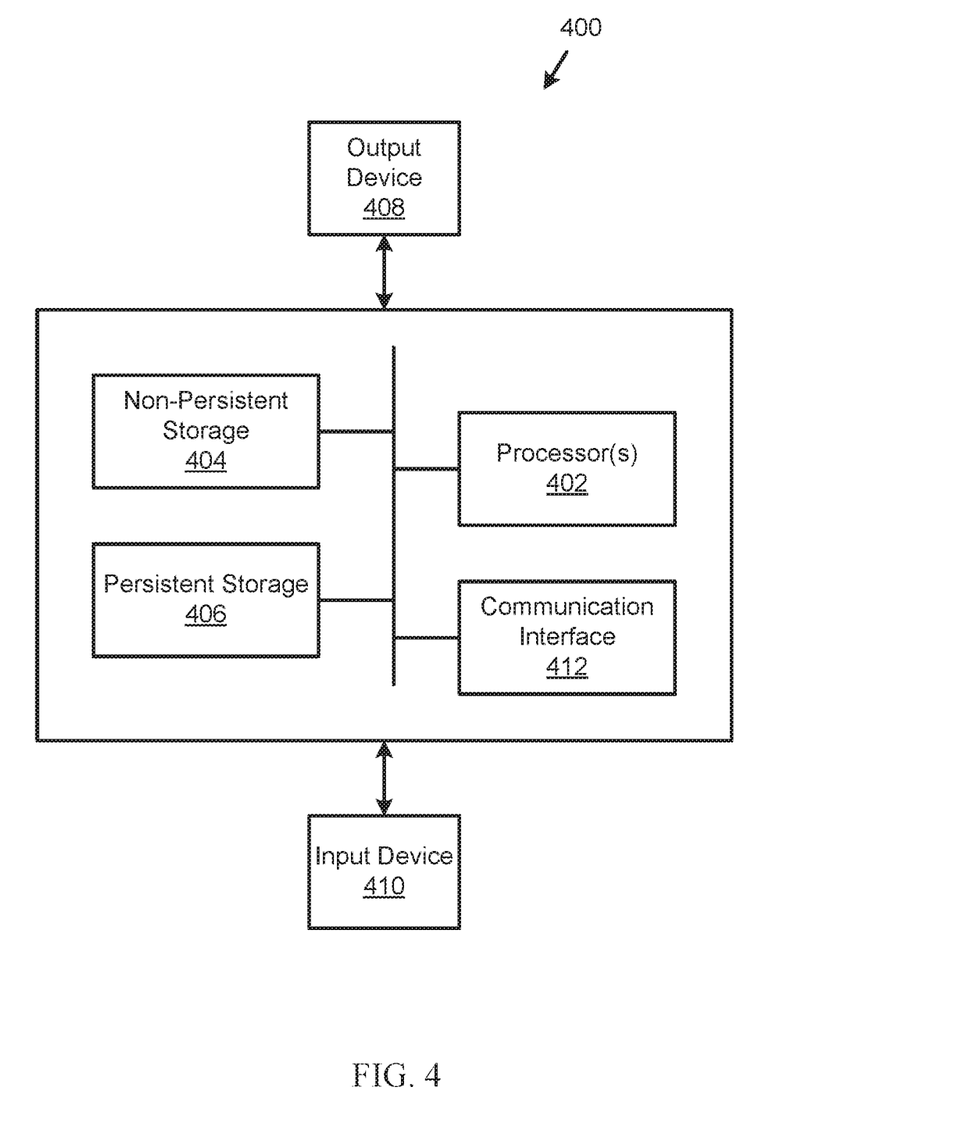
FIG. 4 shows a diagram of a computing device in accordance with one or more embodiments of the invention.

In one or more embodiments of the invention, the production host (100) is a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (100) described throughout this application and/or all, or a portion thereof, of the methods illustrated in FIGS. 2A-2B.

In one or more embodiments of the invention, the production host (100) is implemented as a logical device. The logical device may utilize the computing resources of any number of computing devices and thereby provide the functionality of the production host (100) described throughout this application and/or all, or a portion thereof, of the methods illustrated in FIGS. 2A-2B.

In one or more embodiments of the invention, a source VM (110) is a virtual machine that executes any number of applications (114A, 114N) in the production host (100). In one or more embodiments of the invention, the source VM (110) is a Linux virtual machine. The source VM (110) may be backed up by generating a VM snapshot (112) of the data associated with the source VM (110). The VM snapshot (112) may include some or all of the data corresponding to the applications executing on the source VM.

In one or more embodiments of the invention, the production host (100) includes a coordination VM (120) that initiates and performs backups of a source VM (110) to be sent to a backup storage device. The coordination VM (120) may include a backup agent (122) that performs methods for backing up the source VM (110) while maintaining application consistency. The coordination VM (120) may back up the source VM (110) using methods illustrated in FIGS. 2A-2B.

In one or more embodiments of the invention, the backup agent (122) maintains application consistency by performing an application discovery analysis on the source VM (110). The application discovery analysis includes identifying applications that are active on the source VM (110) and generating scripts to both quiesce the applications executing on the VM (110) prior to generating a snapshot (e.g., 112) and unquiescing the applications on the VM (110) after the snapshot (112) has been generated. In one embodiment of the invention, quiescing the application results in the application being temporarily paused or suspended such that a snapshot can be obtained for the VM on which the application is executing.

To generate the aforementioned scripts, the backup agent may utilize pre-snapshot and post-snapshot templates (124). The pre-snapshot and post-snapshot templates (124) are application-specific and are used to generate pre-snapshot and post-snapshot scripts. Each generated pre-snapshot script, when executed by the corresponding application, quiesces the application. Similarly, each generated post-snapshot script, when executed by the application, unquiesces the corresponding application (which was previously quiesced). The templates may be populated using information about the identified applications in order to generate the aforementioned scripts.

In one or more embodiments of the invention, the snapshot (112) is a copy of a disk file of the source virtual machine (110) at a point in time. The snapshot (112) may include references to data associated with the source VM (110). The snapshot may be used to generate a backup of the source VM (110).

In one or more of embodiments of the invention, the backup agent (122) is implemented as computer instructions, e.g., computer code, stored on a persistent storage that when executed by a processor of the production host (100) cause the production host (100) to provide the aforementioned functionality of the backup agent (122).

In one or more embodiments of the invention, the production host (100) includes a hypervisor (130) that orchestrates the operation of the virtual machines. The hypervisor (130) may orchestrate the operation of the virtual machines by allocating computing resources to each virtual machines.

In one or more embodiments of the invention, the hypervisor (130) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (130) described throughout this application.

In one or more of embodiments of the invention, the hypervisor (130) is implemented as computer instructions, e.g., computer code, stored on a persistent storage that when executed by a processor of the production host (100) causes the production host (100) to provide the functionality of the hypervisor (130) described throughout the application.

In one or more embodiments of the invention, the backup storage device (150) stores backups of data generated by the source VM (110). To achieve the aforementioned functionality, the backup storage device (150) includes a management console (152). The management console (152) may include functionality to initiate the backup of one or more virtual machines and communicate with the backup agent to obtain backups from the production hosts. Additionally, the management console (152) may manage the storage of the obtained backups in the backup storage device.

In one or more embodiments of the invention, the management console (152) is implemented as computer instructions, e.g., computer code, stored on a persistent storage that when executed by a processor of the backup storage device (150) cause the backup storage device (150) to provide the aforementioned functionality of the management console (152).

In one or more embodiments of the invention, the management console (152) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the management console (152).

In one or more embodiments of the invention, the backup storage device (150) is a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage device (150) described throughout this application and/or all, or a portion thereof, of the methods illustrated in FIGS. 2A-2B.

In one or more embodiments of the invention, the backup storage device (150) is implemented as a logical device. The logical device may utilize the computing resources of any number of computing devices and thereby provide the functionality of the backup storage device (150) described throughout this application and/or all, or a portion thereof, of the methods illustrated in FIGS. 2A-2B.

Figure 2A:
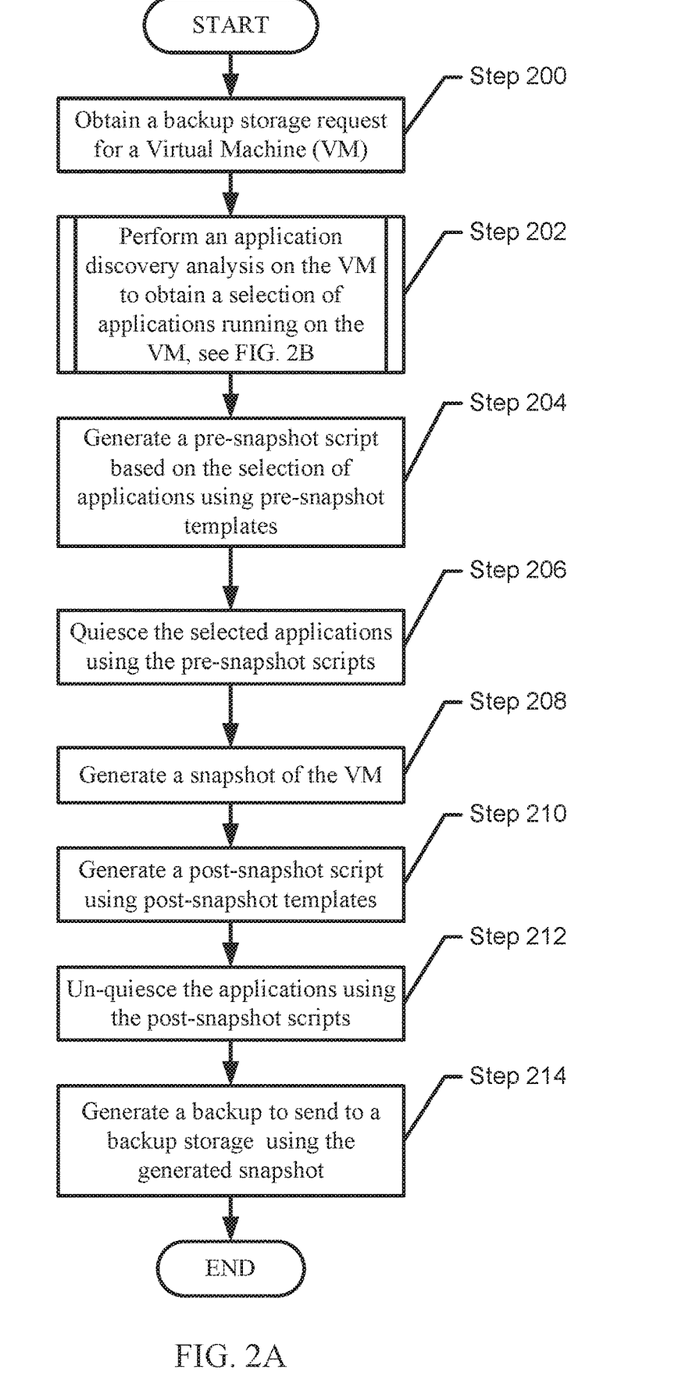
FIG. 2A shows a flowchart for performing a backup operation in accordance with one or more embodiments of the invention.
Figure 2B:
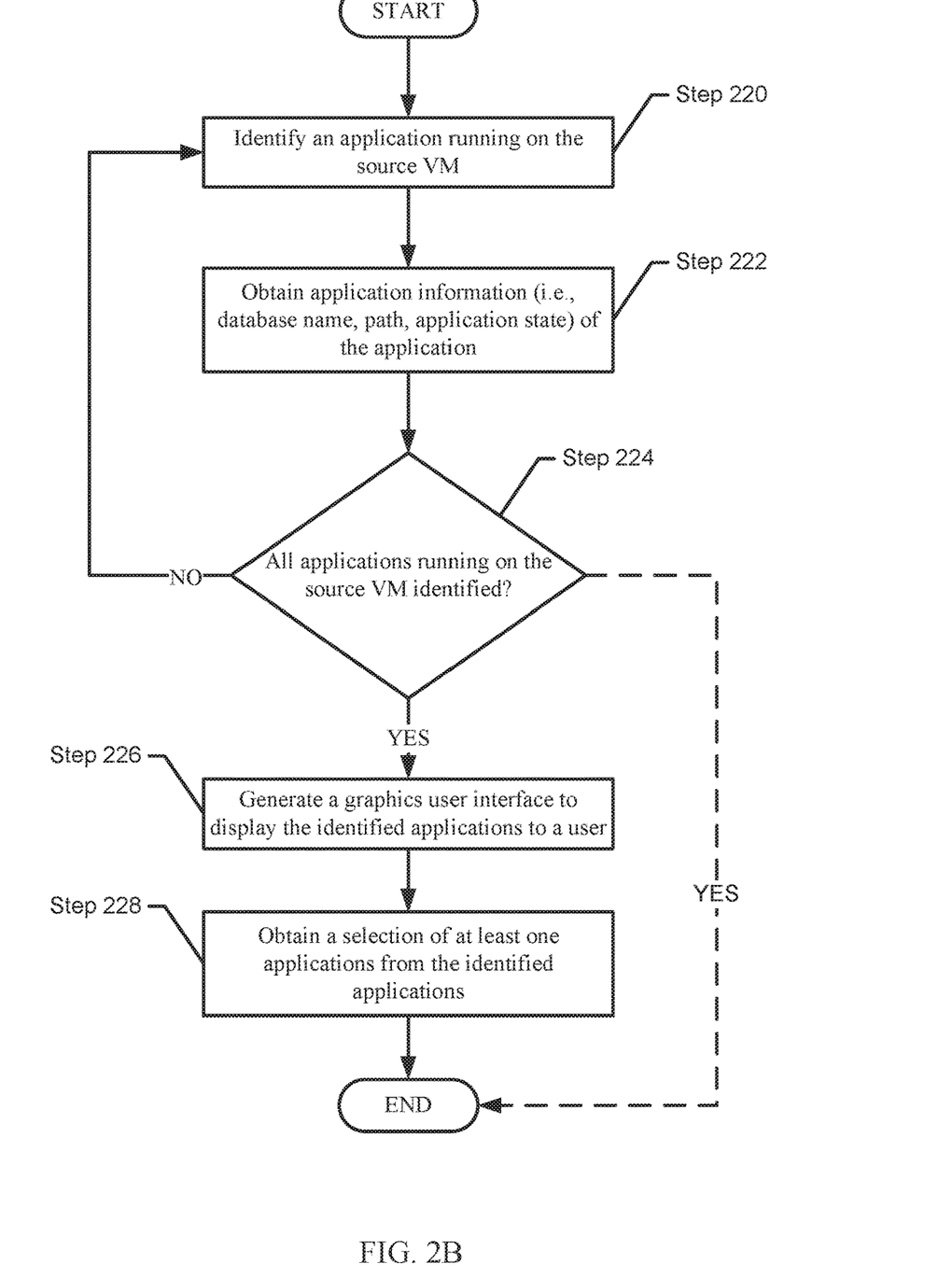
FIG. 2B shows a flowchart for performing an application discovery analysis on a virtual machine in accordance with one or more embodiments of the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for estimating and allocating space in a local computing device in accordance with one or more embodiments of the invention. The method shown in FIG. 2A may be performed by, for example, a backup agent (122, FIG. 1). Other components of the system illustrated in FIG. 1 may perform the method of FIG. 2A without departing from the invention.

Turning to FIG. 2A, in step 200, a backup storage request for a virtual machine (VM) is obtained. The VM may be the source VM (110, FIG. 1) discussed above. The backup storage request may be sent by a client communicating with the backup agent.

In step 202, an application discovery analysis is performed on the VM to obtain a selection of applications executing on the VM. The backup agent may obtain the selection via a plugin executing on the virtual machine that queries the VM using an application programming interface (API) that is native to each application. The plugin may interact with each API to identify the applications executing on the virtual machine.

In one or more embodiments of the invention, information about the applications identified by the plugin is displayed (or otherwise provided) to a user, via a client. Using a client, the user may select, from the identified applications displayed, a selection of applications to quiesce. The user, via the client, may send the selection of applications to the backup agent.

In one or more embodiments of the invention, the backup agent, after determining which applications are present on the VM, may determine, using a policy or other heuristic(s), which application(s) to quiesce.

In step 204, pre-snapshot script is generated based on the selection of applications using pre-snapshot templates. In one or more embodiments of the invention, each pre-snapshot script includes instructions for quiescing an application of the selected of applications. The pre-snapshot scripts may be generated by populating the pre-snapshot templates with each application of the selection of applications using information about from the plugin.

In step 206, the selected of applications is quiesced using the pre-snapshot scripts. In one or more embodiments of the invention, quiescing an application places the application in a quiesced state. The pre-snapshot scripts may be executed by the VM on which the applications are executing in order to quiesce the applications. An application in a quiesced state may be an application that is prepared for a backup. The application may be prepared for a backup by applying configurations to the application that render the application inactive (e.g., no read or write operations may be performed on the application). In other words, an application is not modified while the application is in the quiesced state. In one or more embodiments of the invention, data associated with an application in a quiesced state may not be accessed.

In step 208, a snapshot of the VM is generated. In one or more embodiments of the invention, the snapshot is generated by copying references to data associated with the VM.

In step 210, a post-snapshot script is generated using post-snapshot templates. In one or more embodiments of the invention, each post-snapshot script includes instructions for un-quiescing an application of the selected applications. The post-snapshot scripts may be generated by populating the post-snapshot templates with each application that was quiesced in step 206.

In step 212, the selected applications are un-quiesced using the post-snapshot script. The post snapshot scripts may be executed by the VM on which the applications are executing in order to un-quiesce the applications. In one or more embodiments of the invention, to un-quiesce an application is to remove any configurations applied to the application that rendered the application inactive.

In step 214, a backup is generated to send to a backup storage device using the generated snapshot. The backup may be generated by generating a copy of data referenced in the snapshot and sending the copy to the backup storage device.

FIG. 2B shows a flowchart for performing an application discovery analysis in accordance with one or more embodiments of the invention. The method shown in FIG. 2B may be performed by, for example, a backup agent (122, FIG. 1). Other components of the system illustrated in FIG. 1 may perform the method of FIG. 2B without departing from the invention.

In step 220, an application executing on the source VM is identified. The application may be identified by applying a plugin to the application. The plugin may communicate with the application using an API.

In step 222, application information of the application is obtained. In one or more embodiments of the invention, the information obtained may include a name of the application, a logical path to access the application in a file system, a state of the application (i.e., whether the application is active, inactive, etc.). The backup agent may obtain the information via the plugin communicating with each identified application through their respective APIs.

In step 224, a determination is made about whether all applications executing on the source VM are identified. If all applications executing on the source VM are identified, the method proceeds to step 226; otherwise, the method proceeds to step 220.

In one or more embodiments of the invention, the identified applications executing on the source VM may be listed in a selection of applications, generated by the backup agent. In such embodiments of the invention, the method ends following step 224 if it is determined that all applications executing on the source VM are identified.

In one or more embodiments of the invention, the selection of applications may be generated based on the backup storage request. The backup storage request may include a list of criteria (e.g., a state of the application) that is to be met in order for an application of the identified application to be included in the selection of applications. Whether the application meets the criteria may be determined by the backup agent using the obtained backup information. In this manner, the selection of applications is generated automatically without the use of a client or of a user operating the client.

In step 226, a graphics user interface is generated that displays the identified applications to a user. The graphics user interface (GUI) may be displayed via a client. The client, operated by the user, may display the obtained application information to the user. The user may use the GUI to select, from the identified applications, at least a portion of the identified applications that the user wishes to quiesce during the backup operation.

In step 228, a selection of at least one application from the identified applications is obtained. The selection may be obtained from the client. The selection may include the portion of the identified applications that the user has selected to quiesce. In one or more embodiments of the invention, the selection of the identified applications includes all of the identified applications executing on the VM.

Example

Figure 3:
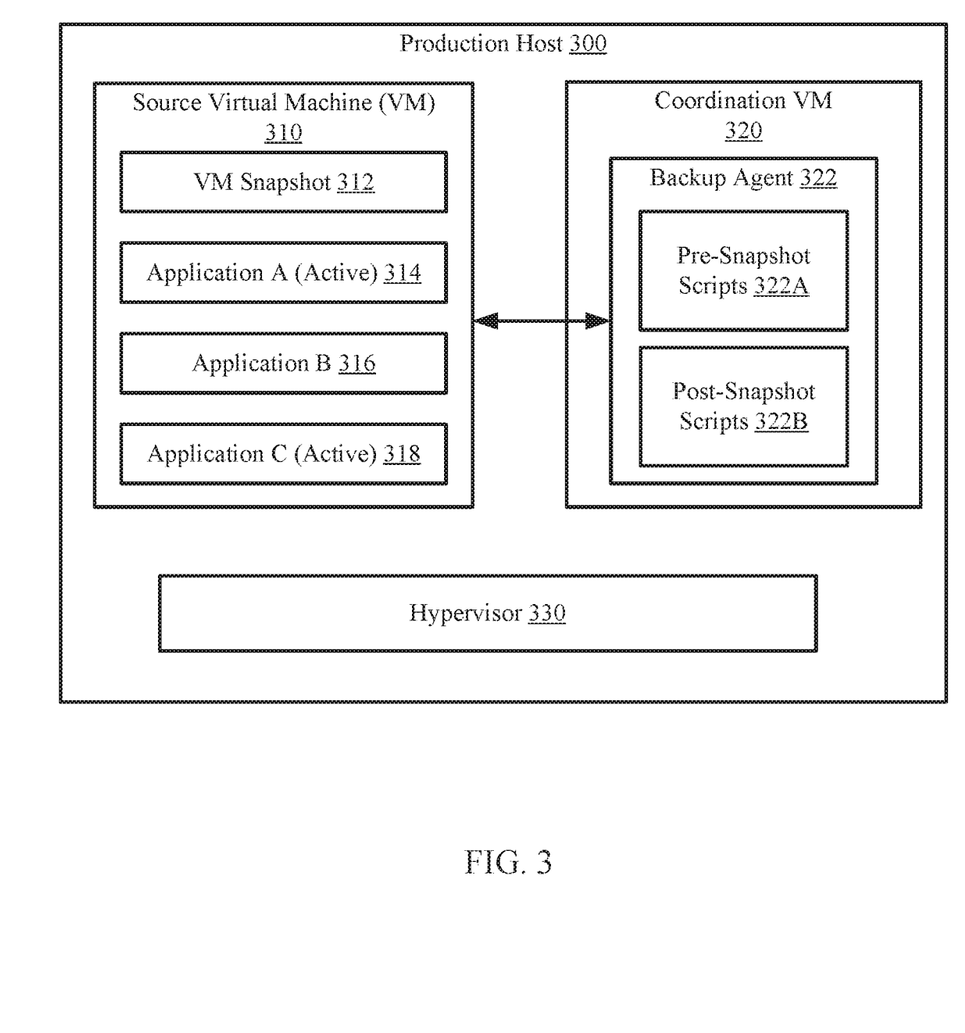
FIG. 3 show an example in accordance with one or more embodiments of the invention.

The following section describes an example. The example is not intended to limit the invention. Consider a scenario in which a client has requested to back up a source VM. The backup storage request may specify that applications executing on the source VM that are active are to be quiesced prior to generating a snapshot. FIG. 3 shows an example production host (300) that hosts the source VM (310) that is requested to be backed up. The production host (310) also hosts a coordination VM (320) that includes a backup agent (322). The backup agent (322), after obtaining the backup storage request for the source VM (310), may perform an application discovery analysis on the source VM (310).

The backup agent (322) may perform the method of FIG. 2B to perform the application discovery analysis. The result includes identifying applications executing on the source VM (310). The applications (314, 316, 318) may each run independently and perform different functionalities. The backup agent, in addition to identifying the applications (314, 316, 318), may identify the state of the applications. Applications A and C (314, 318) may be identified as active. This may mean that at the time that the application discovery analysis is performed, applications A and C (314, 318) were performing read and/or write operations.

The backup agent (322) may generate a selection of applications based on the obtained information and the criteria included in the backup storage request. The selection of applications may specify applications A and C (314, 318). The backup agent (322), using the selection of applications and a pre-snapshot template, generates pre-snapshot scripts (322A). Each of the pre-snapshot scripts (322A) may specify an application (314, 318) to quiesce. The pre-snapshot scripts (322A) may be sent to the VM to be executed. Following the method of FIG. 2A, the backup agent generates a VM snapshot (312) of the source VM after the selection of applications are quiesced. After the snapshot is generated, the backup agent (322) may generate post-snapshot scripts (322B), each corresponding to an application (314, 318) to un-quiesce. Each of the post-snapshot scripts (322B) is sent to the VM to be executed.

The backup agent (322), further following the method of FIG. 2A, may generate a backup to be sent to a backup storage device using the generated VM snapshot (312).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve a backup operation for a virtual machine. The backup operation is improved by introducing scripts to a backup operation that aid in maintaining application consistency during the backup operation. A portion of the scripts may be used to quiesce applications executing in the virtual machine, which prepare the virtual machine for a generation of a snapshot of the virtual machine. A second portion of the scripts may be used to un-quiesce the applications after generating the snapshot. The process of quiescing applications maintains application consistency by allowing all contents of the applications to be captured during the backup operation. The process of un-quiescing the applications after the snapshot generation is complete may reduce latency during a backup operation.

Embodiments of the invention improve the backup operation by performing an application discovery analysis that identifies the applications that are to be quiesced. The application discovery analysis may be used to populate script templates to generate the scripts used to quiesce and/or un-quiesce applications. This may allow computing resources used during a backup operation to be tailored to each virtual machine.

Thus, embodiments of the invention may address the problem of inefficient use of computing resources. This problem arises due to the technological nature of the environment in which backups are are generated.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for performing backup operations on a virtual machine (VM) executing on a physical production host using a coordination VM executing on the production host, the method comprising:
   selecting, by the coordination VM, an application of a plurality of applications executing on the VM to quiesce, wherein the plurality of applications are executing on the VM;
   generating, by a backup agent executing on the coordination VM and using a pre-snapshot template for the application, a pre-snapshot script for the application, wherein generating the pre-snapshot script comprises populating the pre-snapshot template with information corresponding to the application;
   initiating, by the coordination VM, execution of the pre-snapshot script on the VM, wherein the execution of the pre-snapshot script on the VM results in quiescing the application and not quiescing other applications in the plurality of applications;
   after the pre-snapshot script has executed on the VM, generating a snapshot of the virtual machine by the backup agent;
   generating, by the backup agent and using a post-snapshot template for the application, the post-snapshot script for the application, wherein generating the post-snapshot script comprises populating the post-snapshot template with the information corresponding to the application;
   initiating, by the coordination VM, execution of the post-snapshot script on the VM, wherein the execution of the post-snapshot script on the VM results in unquiescing the application; and
   initiating, by the backup agent, a backup operation for the VM using the snapshot.

2. The method of claim 1, further comprising:
   performing application discovery analysis on the VM to select the application.

3. The method of claim 2, wherein performing the application discovery analysis comprises:
   identifying the plurality of applications executing on the VM; and
   selecting the application from the plurality of applications.

4. The method of claim 3, wherein selecting the application from the plurality of applications comprises:
   providing information about the plurality of application to a client device; and
   receiving selection of the application from the client device.

5. The method of claim 4, wherein the information about the plurality of applications is obtained using at least one application programming interface (API) for at least one of the plurality of applications.

6. A system, comprising:
   a processor; and
   a coordination VM when executed by the processor performs a method for performing backup operations on a virtual machine (VM) executing on the system, the method comprising:
   selecting, by the coordination VM, an application of a plurality of applications executing on the VM to quiesce;
   generating, using a pre-snapshot template for the application, a pre-snapshot script for the application, wherein generating the pre-snapshot script comprises populating the pre-snapshot template with information corresponding to the application;
   initiating, execution of the pre-snapshot script on the VM, wherein the execution of the pre-snapshot script on the VM results in quiescing the application and not quiescing other applications in the plurality of applications;
   after the pre-snapshot script has executed on the VM, generating a snapshot of the virtual machine;
   generating using a post-snapshot template for the application, the post-snapshot script for the application, wherein generating the post-snapshot script comprises populating the post-snapshot template with the information corresponding to the application;
   initiating, execution of the post-snapshot script on the VM, wherein the execution of the post-snapshot script on the VM results in unquiescing the application; and
   initiating a backup operation for the VM using the snapshot.

7. The system of claim 6, wherein the method further comprises:
   performing application discovery analysis on the VM to select the application.

8. The system of claim 7, wherein performing the application discovery analysis comprises:
   identifying the plurality of applications executing on the VM; and
   selecting the application from the plurality of applications.

9. The system of claim 8, wherein selecting the application from the plurality of applications comprises:
   providing information about the plurality of application to a client device; and
   receiving selection of the application from the client device.

10. The system of claim 9, wherein the information about the plurality of applications is obtained using at least one application programming interface (API) for at least one of the plurality of applications.

11. A non-transitory computer readable medium comprising computer readable program code, which when executed by a computer processor enables the computer processor to perform a method for performing backup operations, the method comprising:
    selecting an application of a plurality of applications executing on a virtual machine (VM) to quiesce;

generating, using a pre-snapshot template for the application, a pre-snapshot script for the application, wherein generating the pre-snapshot script comprises populating the pre-snapshot template with information corresponding to the application;

initiating execution of the pre-snapshot script on the VM, wherein the execution of the pre-snapshot script on the VM results in quiescing the application and not quiescing other applications in the plurality of applications;

after the pre-snapshot script has executed on the VM, generating a snapshot of the virtual machine;

generating using a post-snapshot template for the application, the post-snapshot script for the application, wherein generating the post-snapshot script comprises populating the post-snapshot template with the information corresponding to the application;

initiating execution of the post-snapshot script on the VM, wherein the execution of the post-snapshot script on the VM results in unquiescing the application; and initiating a backup operation for the VM using the snapshot.

12. The non-transitory computer readable medium of claim 11, further comprising:

performing application discovery analysis on the VM to select the application.

13. The non-transitory computer readable medium of claim 12, wherein performing the application discovery analysis comprises:

identifying plurality of applications executing on the VM; and selecting the application from the plurality of applications.

14. The non-transitory computer readable medium of claim 13, wherein selecting the application from the plurality of applications comprises:

providing information about the plurality of application to a client device; and receiving selection of the application from the client device.

15. The non-transitory computer readable medium of claim 14, wherein the information about the plurality of applications is obtained using at least one application programming interface (API) for at least one of the plurality of applications.

* * * * *